(12) United States Patent
Kakadjian et al.

(10) Patent No.: US 8,141,661 B2
(45) Date of Patent: Mar. 27, 2012

(54) ENHANCED OIL-BASED FOAM DRILLING FLUID COMPOSITIONS AND METHOD FOR MAKING AND USING SAME

(75) Inventors: Sarkis R. Kakadjian, San Antonio, TX (US); Olusegun M. Falana, San Antonio, TX (US); Edward Marshall, San Antonio, TX (US); Michael DiBiasio, Edo Merida (VE); Frank Zamora, San Antonio, TX (US)

(73) Assignee: Clearwater International, LLC, Houston, TX (US)

(*) Notice: Subject to any disclaimer, the term of this patent is extended or adjusted under 35 U.S.C. 154(b) by 499 days.

(21) Appl. No.: 12/167,087

(22) Filed: Jul. 2, 2008

(65) Prior Publication Data

US 2010/0000795 A1    Jan. 7, 2010

(51) Int. Cl.
*C09K 8/38* (2006.01)

(52) U.S. Cl. .............................. 175/69; 175/65; 166/309

(58) Field of Classification Search .................. None
See application file for complete search history.

(56) References Cited

U.S. PATENT DOCUMENTS

| | | | |
|---|---|---|---|
| 2,196,042 A | 4/1940 | Timpson | 23/11 |
| 2,390,153 A | 12/1945 | Kern | 2/72 |
| 3,059,909 A | 10/1962 | Wise | 261/39.3 |
| 3,163,219 A | 12/1964 | Wyant et al. | 16/283 |
| 3,301,723 A | 1/1967 | Chrisp | 14/20 |
| 3,301,848 A | 1/1967 | Halleck | 53/123.1 |
| 3,303,896 A | 2/1967 | Tillotson et al. | 175/69 |
| 3,317,430 A | 5/1967 | Priestley et al. | 510/503 |
| 3,565,176 A | 2/1971 | Wittenwyler | 166/270 |
| 3,856,921 A | 12/1974 | Shrier et al. | 423/228 |
| 3,888,312 A | 6/1975 | Tiner et al. | 166/308.5 |
| 3,933,205 A | 1/1976 | Kiel | 166/308.1 |
| 3,937,283 A | 2/1976 | Blauer et al. | 166/307 |
| 3,960,736 A | 6/1976 | Free et al. | 507/216 |
| 3,965,982 A | 6/1976 | Medlin | 166/249 |
| 3,990,978 A | 11/1976 | Hill | 507/235 |
| 4,007,792 A | 2/1977 | Meister | 166/308.2 |
| 4,052,159 A | 10/1977 | Fuerst et al. | |
| 4,067,389 A | 1/1978 | Savins | 166/246 |
| 4,108,782 A | 8/1978 | Thompson | 507/205 |
| 4,112,050 A | 9/1978 | Sartori et al. | 423/223 |
| 4,112,051 A | 9/1978 | Sartori et al. | 423/223 |
| 4,112,052 A | 9/1978 | Sartori et al. | 423/223 |
| 4,113,631 A | 9/1978 | Thompson | 507/202 |
| 4,378,845 A | 4/1983 | Medlin et al. | 166/297 |
| 4,461,716 A | 7/1984 | Barbarin et al. | 252/307 |
| 4,479,041 A | 10/1984 | Fenwick et al. | 200/81 R |
| 4,506,734 A | 3/1985 | Nolte | 166/308.1 |
| 4,514,309 A | 4/1985 | Wadhwa | 507/211 |
| 4,541,935 A | 9/1985 | Constien et al. | 507/225 |
| 4,549,608 A | 10/1985 | Stowe et al. | 166/280.1 |
| 4,561,985 A | 12/1985 | Glass, Jr. | 507/108 |
| 4,623,021 A | 11/1986 | Stowe | 166/250.1 |
| 4,654,266 A | 3/1987 | Kachnik | 428/403 |
| 4,657,081 A | 4/1987 | Hodge | 166/380.5 |
| 4,660,643 A | 4/1987 | Perkins | 166/283 |
| 4,683,068 A | 7/1987 | Kucera | 507/201 |

(Continued)

*Primary Examiner* — Angela M DiTrani

(74) *Attorney, Agent, or Firm* — Robert W Strozier

(57) ABSTRACT

New oil-based foam drilling fluids for oil and/or gas wells include a base oil, a foaming agent and a polymer including at least one aromatic olefin monomer and at least one diene monomer. The polymer improves foam properties rendering a foam stable at temperatures at or above 350° F.

16 Claims, 1 Drawing Sheet

U.S. PATENT DOCUMENTS

| | | | | |
|---|---|---|---|---|
| 4,686,052 A | 8/1987 | Baranet et al. | ................ | 507/244 |
| 4,695,389 A | 9/1987 | Kubala | .......................... | 507/244 |
| 4,705,113 A | 11/1987 | Perkins | ........................ | 166/302 |
| 4,714,115 A | 12/1987 | Uhri | ........................... | 166/308.1 |
| 4,718,490 A | 1/1988 | Uhri | ........................... | 166/281 |
| 4,724,905 A | 2/1988 | Uhri | ........................... | 166/250.1 |
| 4,725,372 A | 2/1988 | Teot et al. | ..................... | 507/129 |
| 4,739,834 A | 4/1988 | Peiffer et al. | ................. | 166/300.4 |
| 4,741,401 A | 5/1988 | Walles et al. | ................. | 166/360 |
| 4,748,011 A | 5/1988 | Baize | .......................... | 423/228 |
| 4,779,680 A | 10/1988 | Sydansk | ..................... | 166/300 |
| 4,795,574 A | 1/1989 | Syrinek et al. | ................ | 507/238 |
| 4,817,717 A | 4/1989 | Jennings, Jr. et al. | ......... | 166/278 |
| 4,830,106 A | 5/1989 | Uhri | ........................... | 166/250.1 |
| 4,846,277 A | 7/1989 | Khalil et al. | ................. | 166/280.1 |
| 4,848,468 A | 7/1989 | Hazlett et al. | ................. | 166/300 |
| 4,852,650 A | 8/1989 | Jennings, Jr. et al. | ........ | 166/250.1 |
| 4,869,322 A | 9/1989 | Vogt, Jr. et al. | ................ | 166/280.1 |
| 4,892,147 A | 1/1990 | Jennings, Jr. et al. | ........ | 166/280.2 |
| 4,926,940 A | 5/1990 | Stromswold | .................. | 166/247 |
| 4,938,286 A | 7/1990 | Jennings, Jr. | ................. | 166/280.1 |
| 4,978,512 A | 12/1990 | Dillon | .......................... | 423/226 |
| 5,005,645 A | 4/1991 | Jennings, Jr. et al. | ........ | 166/280.1 |
| 5,024,276 A | 6/1991 | Borchardt | .................... | 166/308.6 |
| 5,067,556 A | 11/1991 | Fudono et al. | ................ | 62/196.4 |
| 5,074,359 A | 12/1991 | Schmidt | ..................... | 166/280.1 |
| 5,074,991 A | 12/1991 | Weers | ......................... | 208/236 |
| 5,082,579 A | 1/1992 | Dawson | ....................... | 507/211 |
| 5,106,518 A | 4/1992 | Cooney et al. | .................. | 507/21 |
| 5,110,486 A | 5/1992 | Manalastas et al. | ........... | 507/260 |
| 5,169,411 A | 12/1992 | Weers | ......................... | 44/421 |
| 5,224,546 A | 7/1993 | Smith et al. | .................... | 166/300 |
| 5,228,510 A | 7/1993 | Jennings, Jr. et al. | ......... | 166/263 |
| 5,246,073 A | 9/1993 | Sandiford et al. | ............ | 166/295 |
| 5,259,455 A | 11/1993 | Nimerick et al. | ........... | 166/308.5 |
| 5,330,005 A | 7/1994 | Card et al. | ................. | 166/280.2 |
| 5,342,530 A | 8/1994 | Aften et al. | ................ | 252/8.551 |
| 5,347,004 A | 9/1994 | Rivers et al. | ................... | 544/180 |
| 5,363,919 A | 11/1994 | Jennings, Jr. | ................. | 166/308.1 |
| 5,402,846 A | 4/1995 | Jennings, Jr. et al. | ......... | 166/259 |
| 5,411,091 A | 5/1995 | Jennings, Jr. | ................. | 166/280.1 |
| 5,424,284 A | 6/1995 | Patel et al. | ..................... | 507/127 |
| 5,439,055 A | 8/1995 | Card et al. | ................. | 166/280.2 |
| 5,462,721 A | 10/1995 | Pounds et al. | ................. | 423/226 |
| 5,465,792 A | 11/1995 | Dawson et al. | ............... | 166/295 |
| 5,472,049 A | 12/1995 | Chaffee et al. | ................ | 166/250.1 |
| 5,482,116 A | 1/1996 | El-Rabaa et al. | ........... | 166/250.1 |
| 5,488,083 A | 1/1996 | Kinsey, III et al. | ........... | 507/211 |
| 5,497,831 A | 3/1996 | Hainey et al. | ................ | 166/308.1 |
| 5,501,275 A | 3/1996 | Card et al. | ......................... | 1/166 |
| 5,551,516 A | 9/1996 | Norman et al. | ............ | 166/308.2 |
| 5,624,886 A | 4/1997 | Dawson et al. | ............... | 507/217 |
| 5,635,458 A | 6/1997 | Lee et al. | ..................... | 507/240 |
| 5,649,596 A | 7/1997 | Jones et al. | .................... | 166/300 |
| 5,669,447 A | 9/1997 | Walker et al. | ................... | 166/300 |
| 5,674,377 A | 10/1997 | Sullivan, III et al. | ..... | 208/208 R |
| 5,688,478 A | 11/1997 | Pounds et al. | ................. | 423/228 |
| 5,693,837 A | 12/1997 | Smith et al. | .................... | 556/148 |
| 5,711,396 A | 1/1998 | Joerg et al. | .................... | 180/444 |
| 5,722,490 A | 3/1998 | Ebinger | ........................ | 166/281 |
| 5,744,024 A | 4/1998 | Sullivan, III et al. | .............. | 1/208 |
| 5,755,286 A | 5/1998 | Ebinger | ........................ | 166/281 |
| 5,775,425 A | 7/1998 | Weaver et al. | ................. | 166/276 |
| 5,787,986 A | 8/1998 | Weaver et al. | ............. | 166/280.2 |
| 5,806,597 A | 9/1998 | Tjon-Joe-Pin et al. | ........ | 166/300 |
| 5,807,812 A | 9/1998 | Smith et al. | .................... | 507/238 |
| 5,833,000 A | 11/1998 | Weaver et al. | ................. | 166/276 |
| 5,853,048 A | 12/1998 | Weaver et al. | ................. | 166/279 |
| 5,871,049 A | 2/1999 | Weaver et al. | ................. | 166/276 |
| 5,877,127 A | 3/1999 | Card et al. | ..................... | 507/273 |
| 5,908,073 A | 6/1999 | Nguyen et al. | ................. | 166/276 |
| 5,908,814 A | 6/1999 | Patel et al. | ..................... | 507/131 |
| 5,964,295 A | 10/1999 | Brown et al. | .............. | 166/308.1 |
| 5,979,557 A | 11/1999 | Card et al. | ..................... | 166/300 |
| 5,980,845 A | 11/1999 | Cherry | ......................... | 423/229 |
| 6,016,871 A | 1/2000 | Burts, Jr. | .......................... | 166/30 |
| 6,035,936 A | 3/2000 | Whalen | ....................... | 166/308.5 |
| 6,047,772 A | 4/2000 | Weaver et al. | .................. | 166/27 |
| 6,054,417 A | 4/2000 | Graham et al. | ................. | 507/23 |
| 6,059,034 A | 5/2000 | Rickards et al. | ............ | 166/280.2 |
| 6,060,436 A | 5/2000 | Snyder et al. | ................. | 507/266 |
| 6,069,118 A | 5/2000 | Hinkel et al. | .................. | 507/277 |
| 6,123,394 A | 9/2000 | Jeffrey | ............................ | 299/16 |
| 6,133,205 A | 10/2000 | Jones | ........................... | 507/276 |
| 6,147,034 A | 11/2000 | Jones et al. | ..................... | 507/238 |
| 6,162,449 A | 12/2000 | Maier et al. | .................... | 424/401 |
| 6,162,766 A | 12/2000 | Muir et al. | ..................... | 507/267 |
| 6,169,058 B1 | 1/2001 | Le et al. | ........................ | 507/222 |
| 6,228,812 B1 | 5/2001 | Dawson et al. | ................. | 507/221 |
| 6,247,543 B1 | 6/2001 | Patel et al. | ....................... | 175/64 |
| 6,267,938 B1 | 7/2001 | Warrender et al. | ........... | 423/226 |
| 6,283,212 B1 | 9/2001 | Hinkel et al. | .................. | 166/279 |
| 6,291,405 B1 | 9/2001 | Lee et al. | ........................ | 507/136 |
| 6,330,916 B1 | 12/2001 | Rickards et al. | ............ | 166/280.2 |
| 6,725,931 B2 | 4/2004 | Nguyen et al. | ............. | 166/280.2 |
| 6,756,345 B2 | 6/2004 | Pakulski et al. | ................ | 507/246 |
| 6,793,018 B2 | 9/2004 | Dawson et al. | ............... | 166/300 |
| 6,832,650 B2 | 12/2004 | Nguyen et al. | ................. | 166/279 |
| 6,875,728 B2 | 4/2005 | Gupta et al. | .................. | 507/240 |
| 7,140,433 B2 | 11/2006 | Gatlin et al. | ............. | 166/250.01 |
| 7,268,100 B2 * | 9/2007 | Kippie et al. | .................. | 507/131 |
| 7,350,579 B2 | 4/2008 | Gatlin et al. | ................. | 166/308.3 |
| 2002/0049256 A1 | 4/2002 | Bergeron, Jr. | ................. | 514/674 |
| 2002/0165308 A1 | 11/2002 | Kinniard et al. | ................ | 524/492 |
| 2003/0220204 A1 | 11/2003 | Baran, Jr. et al. | ................ | 507/204 |
| 2005/0045330 A1 | 3/2005 | Nguyen et al. | ................. | 166/281 |
| 2005/0092489 A1 | 5/2005 | Welton et al. | .............. | 166/280.2 |
| 2005/0137114 A1 | 6/2005 | Gatlin et al. | ................... | 510/424 |
| 2005/0153846 A1 | 7/2005 | Gatlin | ............................ | 208/236 |
| 2005/0250666 A1 | 11/2005 | Gatlin et al. | | |
| 2006/0194700 A1 | 8/2006 | Gatlin et al. | ................... | 507/203 |
| 2007/0032693 A1 | 2/2007 | Gatlin et al. | ................... | 507/239 |
| 2007/0129257 A1 * | 6/2007 | Kippie et al. | .................. | 507/102 |
| 2007/0131425 A1 | 6/2007 | Gatlin et al. | ............. | 166/280.2 |
| 2007/0173413 A1 | 7/2007 | Lukocs et al. | .................. | 507/238 |
| 2007/0173414 A1 | 7/2007 | Wilson, Jr. | ..................... | 507/131 |
| 2008/0039345 A1 | 2/2008 | Kippie et al. | .................. | 507/213 |

* cited by examiner

ENHANCED OIL-BASED FOAM DRILLING FLUID COMPOSITIONS AND METHOD FOR MAKING AND USING SAME

BACKGROUND OF THE INVENTION

1. Field of the Invention

The present invention relates to an oil-based foam drilling fluid for oil and/or gas wells and for methods of making and using same.

More particularly, the present invention relates to an oil-based foam drilling fluid (OBFDF) for oil and/or gas wells, where the composition includes a base oil, a foaming agent, and a hydrocarbon soluble polymer comprising a polymer of a styrene monomer and a diene monomer. The foam is stable at a temperature of at least 350° F. The present invention also relates to methods of making and using same.

2. Description of the Related Art

Recently, an oil-based foam drilling fluid (OBFDF) was developed and described in U.S. patent application Ser. No. 11/293,859 filed Dec. 2, 2005, published as US 2007/0129257 and issued as U.S. Pat. No. 7,797,928 on 08/03110. However, the use of this OBFDF fluid for underbalanced and near balance drilling applications is limited by undesirable foam stability (half life time) and undesirable temperature stability, when two organophillic phases (e.g., oil and nitrogen) are employed. When the continuous phase is crude oil, diesel, mineral oil, alpha olefins and/or ester based oils and the foam gas is nitrogen, then the generation of foams that are stable at high temperatures is difficult and has not been achieved to our knowledge.

Generally, to create a stable foam in such environments, foaming systems including mainly fluoro surfactants and/or silicon based surfactants are used.

Alternatively and historically, the problem of generating a stable, high temperature foam in fluids including two orga- nophilic phases has been solved either by changing the gas phase to carbon dioxide or slightly viscosifying the liquid phase with ortho phosphate ester systems using Al or Fe cross-linking agents or with other types of polymers. This alternative requires delicate balance in the amounts of the phosphate ester and cross linking agent, which is difficult to manage by those skilled in the art.

Thus, there is a need in the art for an oil-based foam drilling fluid that does not suffer from the deficiencies of prior art oil-based foaming systems and produces stable foams in flu- ids including two organophilic phases that are stable even in high temperature environments.

SUMMARY OF THE INVENTION

The present invention provides an oil-based foam drilling fluid (OBFDF) comprising a base oil, a foaming agent, an oil or hydrocarbon soluble polymer and nitrogen, where the foam is stable at a temperature of at least 350° F.

The present invention provides a method for preparing the oil-based foam drilling fluids of this invention, where the method includes pre-dissolving an oil or hydrocarbon soluble polymer in concentrations between about 0.05 and about 10.0% w/w in a base oil. The method can also include the step of adding a foaming agent to the fluid. The fluids of this invention offer two fold advantages over prior art fluids: (1) increased base oil viscosity at low shear rates (0.06 l/s) above 40,000 cP due to viscoelastic effects from the polymer addi- tive, which increases the fluids ability to entrap an organo- philic gas phase, and (2) reduced gravity drainage velocity through a plateau border between foam cells.

The present invention provides a method for drilling an oil and/or gas well including the steps of providing an oil-based foam drilling fluid of this invention. The method also includes the step of drilling an oil and/or gas well using the drilling fluid. The method also includes adding or injecting an amount of a nitrogen-containing gas sufficient to produce a stable foam so that a pressure of the fluid is less than or substantially equal to a fluid pressure of the formation into to which drilling is proceeding.

BRIEF DESCRIPTION OF THE DRAWINGS

The invention can be better understood with reference to the following detailed description together with the appended illustrative drawings in which like elements are numbered the same.

DEFINITIONS OF TERM USED IN THE INVENTION

Figure 1:
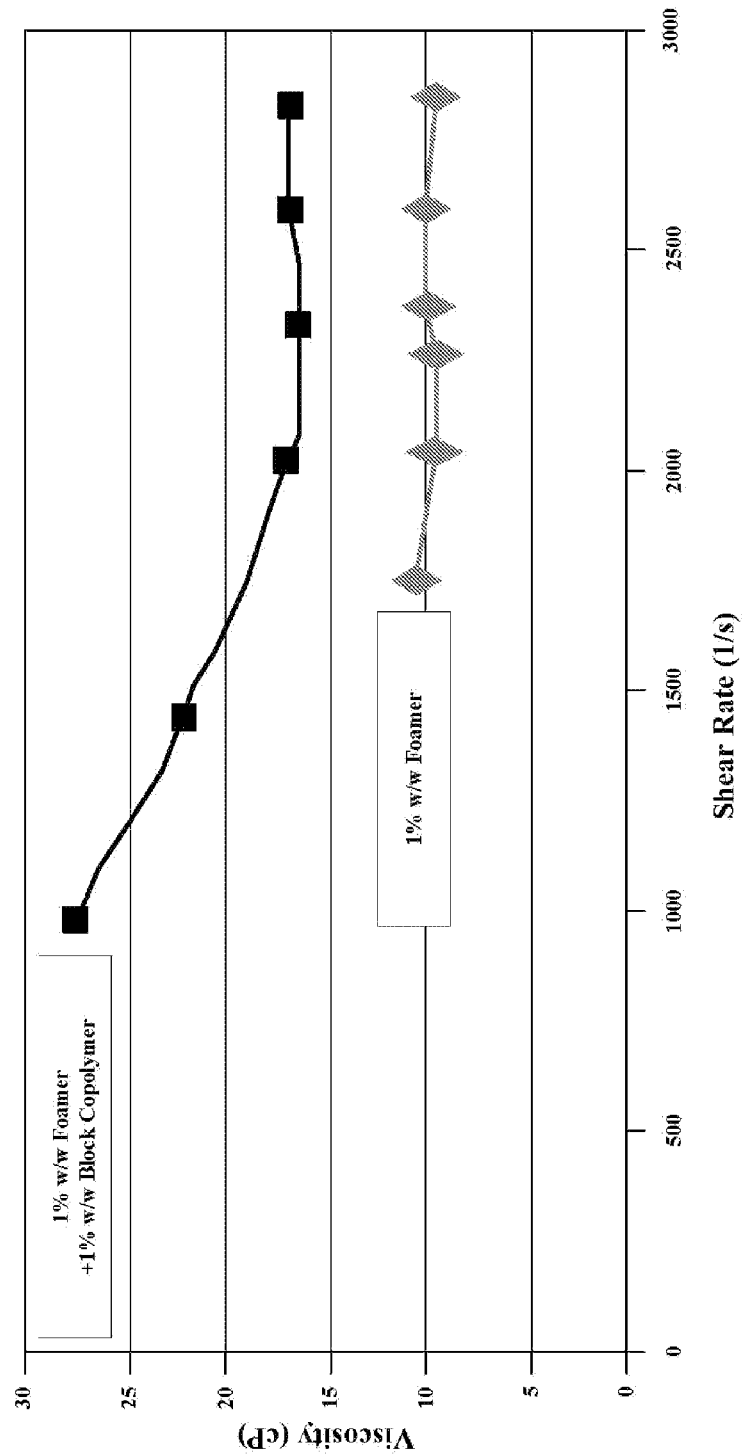
FIG. 1 depicts a plot of a rheological profile of an embodi- ment of an oil-based foam drilling fluid of this invention at room temperature foamed with 300 psig of nitrogen at a quality of about 55%.

The following definitions are provided in order to aid those skilled in the art in understanding the detailed description of the present invention.

The term "amphoteric" refers to surfactants that have both positive and negative charges. The net charge of the surfactant can be positive, negative, or neutral, depending on the pH of the solution.

The term "anionic" refers to those viscoelastic surfactants that possess a net negative charge.

The term "fracturing" refers to the process and methods of breaking down a geological formation, i.e. the rock formation around a well bore, by pumping fluid at very high pressures, in order to increase production rates from a hydrocarbon reservoir. The fracturing methods of this invention use other- wise conventional techniques known in the art.

The abbreviation "RPM" refers to relative permeability modifiers.

The term "surfactant" refers to a soluble, or partially soluble compound that reduces the surface tension of liquids, or reduces inter-facial tension between two liquids, or a liquid and a solid by congregating and orienting itself at these inter- faces.

The term "drilling fluids" refers to any fluid that is used during oil and/or gas well drilling operations.

The term "completion fluids" refers to any fluid that is used in oil and/or gas well completion operations.

The term "production fluids" refers to any fluid that is used in oil and/or gas well production operations.

An under-balanced and/or managed pressure drilling fluid means a drilling fluid having a circulating hydrostatic density (pressure) lower or equal to a formation density (pressure). For example, if a known formation at 10,000 ft (True Vertical Depth—TVD) has a hydrostatic pressure of 5,000 psi or 9.6 lbm/gal, an under-balanced drilling fluid would have a hydro- static pressure less than or equal to 9.6 lbm/gal. Most under- balanced and/or managed pressure drilling fluids include at least a density reduction additive. Other additive many include a corrosion inhibitor, a pH modifier and a shale inhibi- tor.

DETAILED DESCRIPTION OF THE INVENTION

The inventors have found that an oil-based foam drilling fluid can be formulated that has surprisingly high temperature stability at temperatures at or above about 300° F. in the presence of a gas such as a nitrogen-containing gas, without the need for added phosphoesters and crosslinked viscosity enhancers. In certain embodiments, the foams have high temperature stability at temperatures at or above about 325° F. In other embodiments, the foams have high temperature stability at temperatures at or above about 350° F. One difference between the compositions of this invention and those of prior art teachings is that carbon dioxide is not used as gas phase in order to generate a stable oil-based foam. The inventors have found that the compositions of this invention are ideally well suited for forming foam with two organophillic phases: oil and a nitrogen-containing gas such as a cryogenic nitrogen gas having an $N_2$ content greater than 99.99%, a membrane nitrogen gas having an $N_2$ content of 93% or above, or any other nitrogen-containing gas having an $N_2$ content greater than 90%.

There is a great demand for oil-based foam drilling fluids in the oil and gas industry. Basically, these fluids have advantages over non-oil-based foam drilling fluids including at least: improved drill bit lubricity, improved shale stability and improved penetration rate, making them attractive, especially in managed balanced drilling or underbalanced drilling.

The inventors have found that adding an oil soluble polymer including at least one styrene monomer and at least one diene monomer in place of thermally unstable phosphate esters, greatly improves foam properties. In addition to improving normal foam properties, the addition of these polymers increases high temperature stability, where the fluids now have stabilities at temperatures at or above about 300° F. In certain embodiments, the foams have high temperature stability at temperatures at or above about 325° F. In other embodiments, the foams have high temperature stability at temperatures at or above about 350° F.

Drilling Fluids

Generally, a drilling fluid is used during the drilling of a well. Drilling fluids can be designed for so-called over-balanced drilling (a hydrostatic pressure of the drilling fluid is higher than the pore pressure of the formation), under-balanced drilling (a hydrostatic pressure of the drilling fluid is lower than the pore pressure of the formation) or managed pressure drilling, where the hydrostatic pressure of the drilling fluid is managed depending on the nature of the material through which drilling is occurring. Each type of drilling uses different types of drilling fluids. The compositions of this invention are designed to improve dispersion and stability of the resulting drilling fluids so that cuttings remain suspended for longer periods of time or at temperatures up to 350° F.

Compositional Ranges

The foamable hydrocarbon drilling fluids compositions of this invention are defined on a volume percent (vol % or vol. %) basis based on 100 mL of a hydrocarbon base fluid. The foam composition is added to the hydrocarbon base fluid in an amount sufficient to achieve a desired foam height (foam volume) and foam half life (time it takes to reduce by 50 mL of the original foaming solution).

In certain embodiments, the foaming composition is added to the hydrocarbon base fluid in an amount sufficient to produce a foamable hydrocarbon drilling fluid capable of producing a foam having a foam height between about 110 mL and about 200 mL or more and having a half life between about 2 minutes and about 5 minutes or more.

Generally, the foaming composition is added to the hydrocarbon based fluid in a weight percent (% w/w) ranging between about 0.05% w/w and about 5.0% w/w.

In different embodiments, the foaming agent is added to the hydrocarbon base fluid in an amount of 1 percent (% w/w).

Suitable foaming agents for use in this invention include the foaming agent is selected from the group consisting of DC-1250 available from Dow Corning, Zonyl FSG available, APFS-16 available from Applied Polymer, A4851 available from Baker Petrolite, Superfoam available from Oilfield Solutions, Paratene HFA available from Woodrising, DVF-880 available from Parasol Chemicals INC., JBR200, JBR300, JBR400, and JBR500 available from Jeneil Biosurfactant Company, Paratene HFA, Paratene HFB, Paratene MFA, Paratene MFB available from Woodrising Resources Ltd., and mixture or combinations.

Generally, the polymer is added to the hydrocarbon based fluid in a weight percent (% w/w) ranging between about 0.05 and about 5.0% w/w.

Generally the amount of defoaming agent added to the foam drilling fluid systems of this invention varies and might be about twice the amount of foaming agent added.

Foam Characteristics

Generally, the foamable hydrocarbon drilling fluid systems of this invention from an initial fluid amount of 100 mL, will produce a foam having a foam height of at least 140 mL and a half life of at least 2 minutes. In particular, the produced foam will have a foam height between about least 145 mL and about 150 ml depending on the contamination in the foaming fluid and a half life above 3 minutes. The stability or half life and foam height of the produced foam is controlled by the amount and type of the viscosifying agents in the composition, by the amount and type of the foaming agents in the composition, by the amount of gas and type of gas in the composition, by the temperature of the composition and by the pressure of the composition. Generally, increasing the amount of the viscosifying agents increases the foam stability while increasing the concentration of foaming agents increases foam height. Of course, the foam height is also directly proportional to the amount and type of gas dissolved or absorbed in the fluid.

Suitable Reagents

Hydrocarbon Base Fluids

Suitable hydrocarbon base fluids for use in this invention include, without limitation, synthetic hydrocarbon fluids, petroleum based hydrocarbon fluids, natural hydrocarbon (non-aqueous) fluids or other similar hydrocarbons or mixtures or combinations thereof. The hydrocarbon fluids for use in the present invention have viscosities ranging from about $3\times10^{-6}$ to about $600\times10^{-6}$ m$^2$/s (3 to about 600 centistokes). Exemplary examples of such hydrocarbon fluids include, without limitation, poly-α-olefins, polybutenes, polyolesters, biodiesels, simple low molecular weight fatty esters of vegetable or vegetable oil fractions, simple esters of alcohols such as Exxate™ from Exxon Chemicals, vegetable oils, animal oils or esters, other essential oil, diesel, diesel having a low or high sulfur content, kerosene, jet-fuel, white oils, mineral oils, mineral seal oils, hydrogenated oil such as PetroCanada™ HT-40N or IA-35 or similar oils produced by Shell Oil Company, internal olefins (IO) having between about 12 and 20 carbon atoms, linear alpha olefins having between about 14 and 20 carbon atoms, poly-α-olefins having between about 12 and about 20 carbon atoms, isomerized α-olefins (IAO) having between about 12 and about 20 carbon atoms, VM&P Naptha, Linparb, parafins having between 13 and about 16 carbon atoms, HF-1000 (produced by Sasol, USA), and mixtures or combinations thereof.

Suitable poly-α-olefins (PAOs) include, without limitation, polyethylenes, polypropylenes, polybutenes, polypentenes, polyhexenes, polyheptenes, higher PAOs, copolymers thereof, and mixtures thereof. Exemplary examples of PAOs include PAOs sold by Mobil Chemical Company as SHF™ fluids and PAOs sold formerly by Ethyl Corporation under the name ETHYLFLO™ and currently by Albemarle Corporation under the trade name DURASYN™. Such fluids include those specified as ETHYLFLO™ 162, 164, 166, 168, 170, 174, and 180. Well suited PAOs for use in this invention include bends of about 56% of ETHYLFLO™ now DURASYN™ 174 and about 44% of ETHYLFLO™ now DURASYN™ 168. Other examples of PAO's include Chevron Phillips Grades PAO 2, PAO 4, PAO 6 and PAO 8 based on $C_{10}$ alpha olefins, and PAO 2.5, PAO 5, PAO 7 and PAO 9 based on $C_{12}$ alpha olefins.

Exemplary examples of polybutenes include, without limitation, those sold by Amoco Chemical Company and Exxon Chemical Company under the trade names INDOPOL and PARAPOL, respectively. Well suited polybutenes for use in this invention include Amoco's INDOPOL "L" and "H" series, such as H-100, H-300, H-6000, and H-21000.

Exemplary examples of polyolesters include, without limitation, neopentyl glycols, trimethylolpropanes, pentaerythritols, dipentaerythritols, and diesters such as dioctylsebacate (DOS), diactylazelate (DOZ), and dioctyladipate.

Exemplary examples of polyolester include, without limitation, neopentyl glycols, trimethylolpropanes, pentaerythritols, dipentaerythritols, and diesters such as dioctylsebacate (DOS), diactylazelate (DOZ), and dioctyladipate.

Exemplary examples of petroleum based fluids include, without limitation, white mineral oils, paraffinic oils, and medium-viscosity-index (MVI) naphthenic oils having viscosities ranging from about $3 \times 10^{-6}$ to about $600 \times 10^{-6}$ m$^2$/s (3 to about 600 centistokes) at 40° C. Exemplary examples of white mineral oils include those sold by Witco Corporation, Arco Chemical Company, PSI, and Penreco. Exemplary examples of paraffinic oils include solvent neutral oils available from Exxon Chemical Company, high-viscosity-index (HVI) neutral oils available from Shell Chemical Company, and solvent treated neutral oils available from Arco Chemical Company. Exemplary examples of MVI naphthenic oils include solvent extracted coastal pale oils available from Exxon Chemical Company, MVI extracted/acid treated oils available from Shell Chemical Company, and naphthenic oils sold under the names HYDROCAL™ and CALSOL™ by Calumet and hydrogenated oils such as HT-40N and IA-35 from PETROCANADA™ or Shell Oil Company or other similar hydrogenated oils.

Exemplary examples of vegetable oils include, without limitation, castor oils, corn oil, olive oil, sunflower oil, sesame oil, peanut oil, palm oil, palm kernel oil, coconut oil, butter fat, canola oil, rape seed oil, flax seed oil, cottonseed oil, linseed oil, other vegetable oils, modified vegetable oils such as crosslinked castor oils and the like, and mixtures thereof. Exemplary examples of animal oils include, without limitation, tallow, mink oil, lard, other animal oils, and mixtures thereof. Other essential oils will work as well. Of course, mixtures of all the above identified oils can be used as well.

Hydrocarbon Soluble Polymers

Suitable polymers for use in this invention include, without limitation, polymer comprising at least one aromatic olefin monomer and at least one diene monomer. The polymers can includes random polymers, block polymers, graft polymers, star polymers or other multi-armed polymers, which include one or more aromatic olefin monomers and/or one or more diene monomers or mixtures or combinations thereof. The term polymer as used herein refers to homo-polymers, co-polymers, polymers including three of more monomers (olefin monomers and/or diene monomers), polymer including oligomeric or polymeric grafts, which can comprise the same or different monomer composition, arms extending form a polymeric center or starring reagent such as tri and tetra valent linking agents or divinylbenzene nodes or the like, and homo-polymers having differing tacticities or microstructures.

Exemplary examples of aromatic olefin monomers styrene, α-methyl-styrene, α-trifluoromethyl-styrene, fluorinated styrenes, where the fluorine atoms are disposed at ring positions or on ethylenyl positions, chlorinated styrenes, where the chlorine atoms are disposed at ring positions or on ethylenyl positions, alkylated styrenes, where the alkyl group are disposed at ring positions or on ethylenyl positions, vinyl-pyridine, alkylated vinyl-pyridines, where the alkyl group are disposed at ring positions or on ethylenyl positions, fluorinated vinyl-pyridines, where the fluorine atoms are disposed at ring positions or on ethylenyl positions, chlorinated vinyl-pyridines, where the chlorine atoms are disposed at ring positions or on ethylenyl positions, or mixtures or combinations thereof.

Exemplary examples of diene monomers include, without limitation, butadiene (B or BD), isoprene (2-methyl butadiene) (I), 2,3-dimethyl butadiene, 1,3-pentadiene, 1,3-hexadiene, or other similar 1,3-diene monomers, or mixtures or combinations thereof.

Exemplary examples of polymers include, without limitation, styrene-isoprene copolymers (random or block), diblock polymers (SI), triblock polymers (SIS or ISI), multi-blocks (ISISIS, SISISI, etc.), styrene-butadiene copolymers (random or block), diblock polymers (SBR), triblock polymers (SBRS or BRSBR), multi-blocks (BRSBRSBRS, S BRSBRSBR, etc.), styrene-isoprene-butadiene copolymers (random or block), triblock polymers (SBRI, SIBR, or ISBR), multi-blocks (SISBRS, SBRSIS, BRISIBRS, etc.), or mixtures or combinations thereof. Exemplary star polymers include polymers having a core and arm made of a polymer including styrene and I or BD. Other exemplary samples will include graft polymers of styrene and butadiene or isoprene.

Corrosion Inhibitors

Suitable corrosion inhibitor for use in this invention include, without limitation: quaternary ammonium salts e.g., chloride, bromides, iodides, dimethylsulfates, diethylsulfates, nitrites, bicarbonates, carbonates, hydroxides, alkoxides, or the like, or mixtures or combinations thereof, salts of nitrogen bases; or mixtures or combinations thereof. Exemplary quaternary ammonium salts include, without limitation, quaternary ammonium salts from an amine and a quaternarization agent, e.g., alkylchlorides, alkylbromide, alkyl iodides, alkyl sulfates such as dimethyl sulfate, diethyl sulfate, etc., dihalogenated alkanes such as dichloroethane, dichloropropane, dichloroethyl ether, epichlorohydrin adducts of alcohols, ethoxylates, or the like; or mixtures or combinations thereof and an amine agent, e.g., alkylpyridines, especially, highly alkylated alkylpyridines, alkyl quinolines, C6 to C24 synthetic tertiary amines, amines derived from natural products such as coconuts, or the like, dialkylsubstituted methyl amines, amines derived from the reaction of fatty acids or oils and polyamines, amidoimidazolines of DETA and fatty acids, imidazolines of ethylenediamine, imidazolines of diaminocyclohexane, imidazolines of aminoethylethylenediamine, pyrimidine of propane diamine and alkylated propene diamine, oxyalkylated mono and polyamines sufficient to convert all labile hydrogen atoms in the amines to oxygen containing groups, or the like or mixtures or combinations thereof. Exemplary examples of salts of nitrogen bases, include, without limitation, salts of nitrogen bases derived from a salt, e.g.: C1 to C8 monocarboxylic acids such as formic acid, acetic acid, propanoic acid, butanoic acid, pentanoic acid, hexanoic acid, heptanoic acid, octanoic acid, 2-ethylhexanoic acid, or the like; C2 to C12 dicarboxylic acids, C2 to C12 unsaturated carboxylic acids and anhydrides, or the like; polyacids such as diglycolic acid, aspartic acid, citric acid, or the like; hydroxy acids such as lactic acid, itaconic acid, or the like; aryl and hydroxy aryl acids; naturally or synthetic amino acids; thioacids such as thioglycolic acid (TGA); free acid forms of phosphoric acid derivatives of glycol, ethoxylates, ethoxylated amine, or the like, and aminosulfonic acids; or mixtures or combinations thereof and an amine, e.g.: high molecular weight fatty acid amines such as cocoamine, tallow amines, or the like; oxyalkylated fatty acid amines; high molecular weight fatty acid polyamines (di, tri, tetra, or higher); oxyalkylated fatty acid polyamines; amino amides such as reaction products of carboxylic acid with polyamines where the equivalents of carboxylic acid is less than the equivalents of reactive amines and oxyalkylated derivatives thereof, fatty acid pyrimidines; monoimidazolines of EDA, DETA or higher ethylene amines, hexamethylene diamine (HMDA), tetramethylenediamine (TMDA), and higher analogs thereof, bisimidazolines, imidazolines of mono and polyorganic acids; oxazolines derived from monoethanol amine and fatty acids or oils, fatty acid ether amines, mono and bis amides of aminoethylpiperazine; GAA and TGA salts of the reaction products of crude tall oil or distilled tall oil with diethylene triamine; GAA and TGA salts of reaction products of dimer acids with mixtures of polyamines such as TMDA, HMDA and 1,2-diaminocyclohexane; TGA salt of imidazoline derived from DETA with tall oil fatty acids or soy bean oil, canola oil, or the like; or mixtures or combinations thereof.

Other Additives

The drilling fluids of this invention can also include other additives as well such as scale inhibitors, carbon dioxide control additives, paraffin control additives, oxygen control additives, or other additives.

Scale Control

Suitable additives for Scale Control and useful in the compositions of this invention include, without limitation: Chelating agents, e.g., Na, K or $NH_4$ salts of EDTA; Na, K or $NH_4$ salts of NTA; Na, K or $NH_4$ salts of Erythorbic acid; Na, K or $NH_4$ salts of thioglycolic acid (TGA); Na, K or $NH_4$ salts of Hydroxy acetic acid; Na, K or $NH_4$ salts of Citric acid; Na, K or $NH_4$ salts of Tartaric acid or other similar salts or mixtures or combinations thereof. Suitable additives that work on threshold effects, sequestrants, include, without limitation: Phosphates, e.g., sodium hexamethylphosphate, linear phosphate salts, salts of polyphosphoric acid, Phosphonates, e.g., nonionic such as HEDP (hydroxythylidene diphosphoric acid), PBTC (phosphoisobutane, tricarboxylic acid), Amino phosphonates of: MEA (monoethanolamine), $NH_3$, EDA (ethylene diamine), Bishydroxyethylene diamine, Bisaminoethylether, DETA (diethylenetriamine), HMDA (hexamethylene diamine), Hyper homologues and isomers of HMDA, Polyamines of EDA and DETA, Diglycolamine and homologues, or similar polyamines or mixtures or combinations thereof, Phosphate esters, e.g., polyphosphoric acid esters or phosphorus pentoxide ($P_2O_5$) esters of: alkanol amines such as MEA, DEA, triethanol amine (TEA), Bishydroxyethylethylene diamine; ethoxylated alcohols, glycerin, glycols such as EG (ethylene glycol), propylene glycol, butylene glycol, hexylene glycol, trimethylol propane, pentaeryithrol, neopentyl glycol or the like; Tris & Tetrahydroxy amines; ethoxylated alkyl phenols (limited use due to toxicity problems), Ethoxylated amines such as monoamines such as MDEA and higher amines from 2 to 24 carbons atoms, diamines 2 to 24 carbons carbon atoms, or the like; Polymers, e.g., homopolymers of aspartic acid, soluble homopolymers of acrylic acid, copolymers of acrylic acid and methacrylic acid, terpolymers of acylates, AMPS, etc., hydrolyzed polyacrylamides, poly malic anhydride (PMA); or the like; or mixtures or combinations thereof.

Carbon Dioxide Neutralization

Suitable additives for $CO_2$ neutralization and for use in the compositions of this invention include, without limitation, MEA, DEA, isopropylamine, cyclohexylamine, morpholine, diamines, dimethylaminopropylamine (DMAPA), ethylene diamine, methoxy proplyamine (MOPA), dimethylethanol amine, methyldiethanolamine (MDEA) & oligomers, imidazolines of EDA and homologues and higher adducts, imidazolines of aminoethylethanolamine (AEEA), aminoethylpiperazine, aminoethylethanol amine, di-isopropanol amine, DOW AMP-90™, Angus AMP-95, dialkylamines (of methyl, ethyl, isopropyl), mono alkylamines (methyl, ethyl, isopropyl), trialkyl amines (methyl, ethyl, isopropyl), bishydroxyethylethylene diamine (THEED), or the like or mixtures or combinations thereof.

Paraffin Control

Suitable additives for Paraffin Removal, Dispersion, and/or paraffin Crystal Distribution include, without limitation: CELLOSOLVES™ available from DOW Chemicals Company; CELLOSOLVE™ acetates; Ketones; Acetate and Formate salts and esters; surfactants composed of ethoxylated or propoxylated alcohols, alkyl phenols, and/or amines; methylesters such as coconate, laurate, soyate or other naturally occurring methylesters of fatty acids; sulfonated methylesters such as sulfonated coconate, sulfonated laurate, sulfonated soyate or other sulfonated naturally occurring methylesters of fatty acids; low molecular weight quaternary ammonium chlorides of coconut oils soy oils or $C_{10}$ to $C_{24}$ amines or monohalogenated alkyl and aryl chlorides; quanternary ammonium salts composed of disubstituted (e.g., dicoco, etc.) and lower molecular weight halogenated alkyl and/or aryl chlorides; gemini quaternary salts of dialkyl (methyl, ethyl, propyl, mixed, etc.) tertiary amines and dihalogenated ethanes, propanes, etc. or dihalogenated ethers such as dichloroethyl ether (DCEE), or the like; gemini quaternary salts of alkyl amines or amidopropyl amines, such as cocoamidopropyldimethyl, bis quaternary ammonium salts of DCEE; or mixtures or combinations thereof. Suitable alcohols used in preparation of the surfactants include, without limitation, linear or branched alcohols, specially mixtures of alcohols reacted with ethylene oxide, propylene oxide or higher alkyleneoxide, where the resulting surfactants have a range of HLBs. Suitable alkylphenols used in preparation of the surfactants include, without limitation, nonylphenol, decylphenol, dodecylphenol or other alkylphenols where the alkyl group has between about 4 and about 30 carbon atoms. Suitable amines used in preparation of the surfactants include, without limitation, ethylene diamine (EDA), diethylenetriamine (DETA), or other polyamines. Exemplary examples include Quadrols, Tetrols, Pentrols available from BASF. Suitable alkanolamines include, without limitation, monoethanolamine (MEA), diethanolamine (DEA), reactions products of MEA and/or DEA with coconut oils and acids.

Oxygen Control

The introduction of water downhole often is accompanied by an increase in the oxygen content of downhole fluids due to oxygen dissolved in the introduced water. Thus, the materials introduced downhole must work in oxygen environments or must work sufficiently well until the oxygen content has been depleted by natural reactions. For system that cannot tolerate oxygen, then oxygen must be removed or controlled in any material introduced downhole. The problem is exacerbated during the winter when the injected materials include winterizers such as water, alcohols, glycols, Cellosolves, formates, acetates, or the like and because oxygen solubility is higher to a range of about 14-15 ppm in very cold water. Oxygen can also increase corrosion and scaling. In CCT (capillary coiled tubing) applications using dilute solutions, the injected solutions result in injecting an oxidizing environment ($O_2$) into a reducing environment ($CO_2$, $H_2S$, organic acids, etc.).

Options for controlling oxygen content includes: (1) de-aeration of the fluid prior to downhole injection, (2) addition of normal sulfides to product sulfur oxides, but such sulfur oxides can accelerate acid attack on metal surfaces, (3) addition of erythorbates, ascorbates, diethylhydroxyamine or other oxygen reactive compounds that are added to the fluid prior to downhole injection; and (4) addition of corrosion inhibitors or metal passivation agents such as potassium (alkali) salts of esters of glycols, polyhydric alcohol ethyloxylates or other similar corrosion inhibitors. Exemplary examples oxygen and corrosion inhibiting agents include mixtures of tetramethylene diamines, hexamethylene diamines, 1,2-diaminecyclohexane, amine heads, or reaction products of such amines with partial molar equivalents of aldehydes. Other oxygen control agents include salicylic and benzoic amides of polyamines, used especially in alkaline conditions, short chain acetylene diols or similar compounds, phosphate esters, borate glycerols, urea and thiourea salts of bisoxalidines or other compound that either absorb oxygen, react with oxygen or otherwise reduce or eliminate oxygen.

Salt Inhibitors

Suitable salt inhibitors for use in the fluids of this invention include, without limitation, Na MINUS-NITRILOTRIAC-ETAMIDE™ available from Clearwater International, LLC of Houston, Tex.

Defoamers

Suitable defoaming agents for use in this invention include, without limitation, any defoaming agent capable of reducing the foam height of the foamed drilling fluid systems of this invention. Exemplary examples of defoaming agents are Dow Corning Antifoamers such as DOW CORNING™ 200®.

Experiments of the Invention

Foam Test

Foam test used a Lab Hamilton Beach Mixer. The test involves mixing drilling fluids at high speed for 60 seconds and noting any change at 15 second intervals. Foam concentrations tested are as set forth herein. After foaming on the mixer, the test drilling fluids were poured into either a 1,000 mL or 500 mL graduated cylinder to determine if the foam measurement were linear. The foam height represented the mL occupied by the foam after the foam was poured into the cylinder. The half life represents the time it takes to drain 50% of the original foaming solution. If the foaming solution volume is 100 ml the half life time is the one it takes to drain 50 ml of the liquid phase.

EXAMPLES

The following example illustrates the preparation of a variety of oil-based foam drilling fluid in the absence and presence of a polymer additive designed to illustrate the high temperature properties of the foaming agent.

To 100 mL of "Off Road" Red Diesel #2 high sulfur content was added a foamer and optionally a polymer of this invention in the amounts indicated in the following table. The resulting solutions were foamed and a foam height and foam a half life were measured.

TABLE I

Foam Properties of Hydrocarbon Foamer in Various Fluids Foaming Solution 100 mL

| Fluid‡ | 1% w/w Foamer* | | 1% w/w Foamer* + 1% w/w Block Copolymer** | |
|---|---|---|---|---|
| | Foam Volume (mL) | Half Life (min:sec) | Foam Volume (mL) | Half Life (min:sec) |
| None | 186 | 2:50 | 180 | 4:00 |
| 5% of 3.5% Sea Water | 162 | 2:00 | 170 | 4:00 |
| 10% of 3.5% Sea Water | 162 | 2:00 | 170 | 4:00 |
| 20% of 3.5% Sea Water | 160 | 2:00 | 170 | 4:00 |
| 5% Hatters Pond Condensate | 170 | 2:15 | 170 | 4:00 |
| 10% Hatters Pond Condensate | 180 | 2:20 | 160 | 4:00 |

‡Off Road Diesel #2 Base Fluid
*Foamer DC-1250
**SV-150

Table II compares foam stability of the foam system when using Diesel as base system and highly biodegradable HF-1000 (Paraffin/Olefins/Oxygenated mixtures) as base system. Table III shows the variation of the plastic viscosity and yield point in the foaming solution at various concentrations of the block copolymer.

In FIG. 1, a plot of a rheological profile of an embodiment of an oil-based foam drilling fluid of this invention at room temperature foamed with 300 psig of nitrogen at a quality of about 55% is shown. The average viscosity of the foam in the Newtonian range of a fluid including 1% w/w of the foamer in the absence of the polymer additive was 9.72 cP, while the average viscosity of the foam in the Newtonian range of a fluid including 1% w/w of the foamer in the presence of the polymer additive was 16.85 cP. Comparative friction in the laminar regime showed a 73% increase in friction loss of the fluid with polymer while in turbulent regime an increase of 14% was observed.

TABLE II

Foam Properties of Hydrocarbon Foamer in Various Fluids

| Base Oil System | Concentrations | 3.5% Sea Water | 3.0% KCL | Condensate | Crude Oil | Aging Temperature ° F. (24 hr) | Foam Height | Half Life (min.) | Ave Recycle (10 times) |
|---|---|---|---|---|---|---|---|---|---|
| Diesel | 1% w/w DC-1250 + 1% w/w SV-150 | | | | | | 170 | 4:00 | Foam Height: 200 mL Half Time: 4:15 min |
| Diesel | 1% w/w DC-1250 + 1% w/w SV-150 | 10% | | | | | 170 | 4:00 | |
| Diesel | 1% w/w DC-1250 + 1% w/w SV-150 | 20% | | | | | 170 | 4:00 | |
| Diesel | 1% w/w DC-1250 + | 30% | | | | | 170 | 4:00 | |

TABLE II-continued

Foam Properties of Hydrocarbon Foamer in Various Fluids

| Base Oil System | Concentrations | 3.5% Sea Water | 3.0% KCL | Condensate | Crude Oil | Aging Temperature °F. (24 hr) | Foam Height | Half Life (min.) | Ave Recycle (10 times) |
|---|---|---|---|---|---|---|---|---|---|
| Diesel | 1% w/w DC-1250 + 1% w/w SV-150 | 5% | | | | | 160 | 4:00 | |
| Diesel | 1% w/w DC-1250 + 1% w/w SV-150 | 10% | | | | | 160 | 4:00 | |
| Diesel | 1% w/w DC-1250 + 1% w/w SV-150 | 20% | | | | | 160 | 4:00 | |
| Diesel | 1% w/w DC-1250 + 1% w/w SV-150 | | | 5% | | | 160 | 4:00 | |
| Diesel | 1% w/w DC-1250 + 1% w/w SV-150 | | | 10% | | | 170 | 4:00 | |
| Diesel | 1% w/w DC-1250 + 1% w/w SV-150 | | | 20% | | | 180 | 4:00 | |
| Diesel | 1% w/w DC-1250 + 1% w/w SV-150 | | | | 10% | | 160 | 4:00 | |
| Diesel | 1% w/w DC-1250 + 1% w/w SV-150 | | | | 20% | | 160 | 4:00 | |
| Diesel | 1% w/w DC-1250 + 1% w/w SV-150 | | | | | 450 | 160 | 4:00 | |
| HF1000 | 1% w/w DC-1250 + 1% w/w SV-150 | | | | | | 170 | 0.166667 | Foam Height: 200 mL Half Time: 4:15 min |
| HF1000 | 1% w/w DC-1250 + 1% w/w SV-150 | 10% | | | | | 170 | 2:45 | |
| HF1000 | 1% w/w DC-1250 + 1% w/w SV-150 | 20% | | | | | 160 | 2:40 | |
| HF1000 | 1% w/w DC-1250 + 1% w/w SV-150 | 30% | | | | | 160 | 2:30 | |
| HF1000 | 1% w/w DC-1250 + 1% w/w SV-150 | | 5% | | | | 170 | 3:00 | |
| HF1000 | 1% w/w DC-1250 + 1% w/w SV-150 | | 10% | | | | 160 | 2:45 | |
| HF1000 | 1% w/w DC-1250 + 1% w/w SV-150 | | 20% | | | | 160 | 2:30 | |
| HF1000 | 1% w/w DC-1250 + 1% w/w SV-150 | | | 5% | | | 170 | 3:00 | |
| HF1000 | 1% w/w DC-1250 + 1% w/w SV-150 | | | 10% | | | 160 | 2:40 | |
| HF1000 | 1% w/w DC-1250 + 1% w/w SV-150 | | | 20% | | | 160 | 2:30 | |
| HF1000 | 1% w/w DC-1250 + 1% w/w SV-150 | | | | 10% | | 180 | 3:00 | |
| HF1000 | 1% w/w DC-1250 + 1% w/w SV-150 | | | | 20% | | 190 | 3:00 | |
| HF1000 | 1% w/w DC-1250 + 1% w/w SV-150 | | | | | 450 | 160 | 3:40 | |

TABLE III

Rheological Properties of Red Diesel-Based Drilling Fluid#

| Fluid‡ | Apparent Viscosity cP (300 RPM) | Yield Point lb/100 ft² |
|---|---|---|
| 1% w/w Foamer* | 5 | 1 |
| 1% w/w Foamer* + 1% w/w Block Copolymer** | 13 | 2 |
| 1% w/w Foamer* + 2% w/w Block Copolymer** | 47 | 18 |
| 1% w/w Foamer* + 5% w/w Block Copolymer** | 253 | Too high to be measured |

(Fan 35A Results Using R1-B1)
‡Off Road Diesel #2 Base Fluid
*Foamer DC-1250
**SV-150

Example 2

Foam/Defoam cycle: Defoaming tests were made adding 2% w/w of deformer DC 200® fluid related to the foaming solution, which included 1% of foaming agent DC 1250 (foamer and defoamer are products of Dow Corning, USA) and 1% of polymer INFINEUM SV150™ (manufactured by Infineum, USA). Re-foaming tests were made adding 1% of the foaming agent. This cycle was repeated at least 10 times obtaining foam half life time of at least 4:00 minutes and foam height of 200 mL.

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

We claim:

1. A method for drilling a well comprising the steps of: adding an effective amount of a foaming composition to a hydrocarbon base fluid to form a hydrocarbon drilling fluid, where the foaming composition comprises a foaming agent and a stabilizing amount of a polymer, where the stabilizing amount of the polymer is sufficient to form a foam stable to a temperature of at least 350° F., where the foaming agent comprises a silicone foaming agent, a fluorinated oligomeric or polymeric foaming agent, or a mixtures thereof, where the polymer comprises a block copolymer of styrene and a diene, and where the polymer is present in an amount sufficient to increase a viscosity of the base fluid at a shear rate of 0.06 l/s to a viscosity above 40,000 cP, pumping the hydrocarbon drilling fluid into a drill string while drilling, pumping an organophillic gas into the well at or near a distal end of the drilling string or at or near a drill bit at a rate sufficient to produce a foamed drilling fluid having a reduced fluid column weight, having a foam height between about 110 mL and about 200 mL and having a half life between about 2 minutes and about 5 minutes, where the foamed drilling fluid increases a fluid removal rate from the well and increases cuttings and other entrained materials removal from the well, and withdrawing the foam from the well.

2. The method of claim 1, further comprising the step of: after the withdrawing step, breaking the foam with a sufficient amount of a defoaming agent.

3. The method of claim 2, further comprising the step of: repeating the two pumping steps, the withdrawing step and breaking steps at least 5 times with or without adding an additional amount of the foaming composition or a component thereof.

4. The method of claim 2, further comprising the step of: repeating the two pumping steps, the withdrawing step and breaking steps at least 10 times with or without adding an additional amount of the foaming composition or a component thereof.

5. The method of claim 1, wherein the foaming agent is a fluorinated oligomeric or polymeric foaming agent.

6. The method of claim 1, wherein the hydrocarbon base fluid is selected from the group consisting of synthetic hydrocarbon fluids, petroleum based hydrocarbon fluids, natural hydrocarbon (non-aqueous) fluids or mixtures or combinations thereof.

7. The method of claim 1, wherein the hydrocarbon base fluid is selected from the group consisting of polyalphaolefins, polybutenes, polyolesters, vegetable oils, animal oils, other essential oil, diesel having high or low sulfur content, crude oil, condensate, xylene, mineral sprits, low end kerosene cuts, paraffins, kerosene, jet-fuel, internal olefins (IO) having between about 12 and 20 carbon atoms, linear alpha olefins having between about 14 and 20 carbon atoms, poly-alpha olefins having between about 12 and about 20 carbon atoms, isomerized alpha olefins (IAO) having between about 12 and about 20 carbon atoms, and mixtures or combinations thereof.

8. The method of claim 1, wherein the block copolymer comprises a random styrene-isoprene copolymer, a styrene-isoprene diblock polymer, a styrene-isoprene triblock polymer, a styrene-isoprene multi-block polymer, a random styrene-butadiene copolymer, a styrene-butadiene diblock polymers, a styrene-butadiene triblock polymer, a styrene-butadiene multi-block polymer, a random styrene-isoprene-butadiene copolymer, a styrene-isoprene-butadiene triblock polymer, a styrene-isoprene-butadiene multi-block polymer, a star polymer including a core and arms comprising styrene and butadiene or isoprene, graft polymers of styrene and butadiene or isoprene or mixtures and combinations thereof.

9. The method of claim 1, wherein the diene comprises butadiene, isoprene, or a mixture thereof.

10. A method for drilling comprising the steps of:
circulating a hydrocarbon drilling fluid system including a hydrocarbon fluid and an effective amount of a foaming composition into a borehole of an oil or gas well, where the foaming composition comprises a foaming agent and a stabilizing amount of a polymer, where the stabilizing amount of the polymer is sufficient to form a foam stable to a temperature of at least 350° F., where the foaming agent comprises a silicone foaming agent, a fluorinated oligomeric or polymeric foaming agent, or a mixtures thereof, where the polymer comprises a block copolymer of styrene and a diene, where the polymer is present in an amount sufficient to increase a viscosity of the base fluid at a shear rate of 0.06 l/s to a viscosity above 40,000 cP, injecting an organophilic gas into the fluid at a rate sufficient to form a foamed drilling fluid having a reduced fluid column weight, having a foam height between about 110 mL and about 200 mL and having a half life between about 2 minutes and about 5 minutes, where the foamed drilling fluid increases a fluid removal rate from the well and increases cuttings and other entrained materials removal from the well, and withdrawing the foamed drilling fluid from the well.

11. The method of claim 10, further comprising the step of: breaking the foam with a sufficient amount of a defoaming agent.

12. The method of claim 11, further comprising the step of: repeating the circulating, injecting and breaking steps at least 5 times with or without adding an additional amount of the foaming composition or a component thereof.

13. The method of claim 11, further comprising the step of: repeating the circulating, injecting and breaking steps at least 10 times with or without adding an additional amount of the foaming composition or a component thereof.

14. The method of claim 10, wherein the foaming agent is a fluorinated oligomeric or polymeric foaming agent.

15. The method of claim 10, wherein the block copolymer comprises a random styrene-isoprene copolymer, a styrene-isoprene diblock polymer, a styrene-isoprene triblock polymer, a styrene-isoprene multi-block polymer, a random styrene-butadiene copolymer, a styrene-butadiene diblock polymers, a styrene-butadiene triblock polymer, a styrene-butadiene multi-block polymers, a random styrene-isoprene-butadiene copolymer, a styrene-isoprene-butadiene triblock polymer, a styrene-isoprene-butadiene multi-block polymer, a star polymer including a core and arms comprising styrene and butadiene or isoprene, graft polymers of styrene and butadiene or isoprene or mixtures and combinations thereof.

16. The method of claim 10, wherein the diene comprises butadiene, isoprene, or a mixture thereof.

* * * * *